(No Model.)
W. WRIGHT.
ECCENTRIC ROD.
No. 428,542. Patented May 20, 1890.
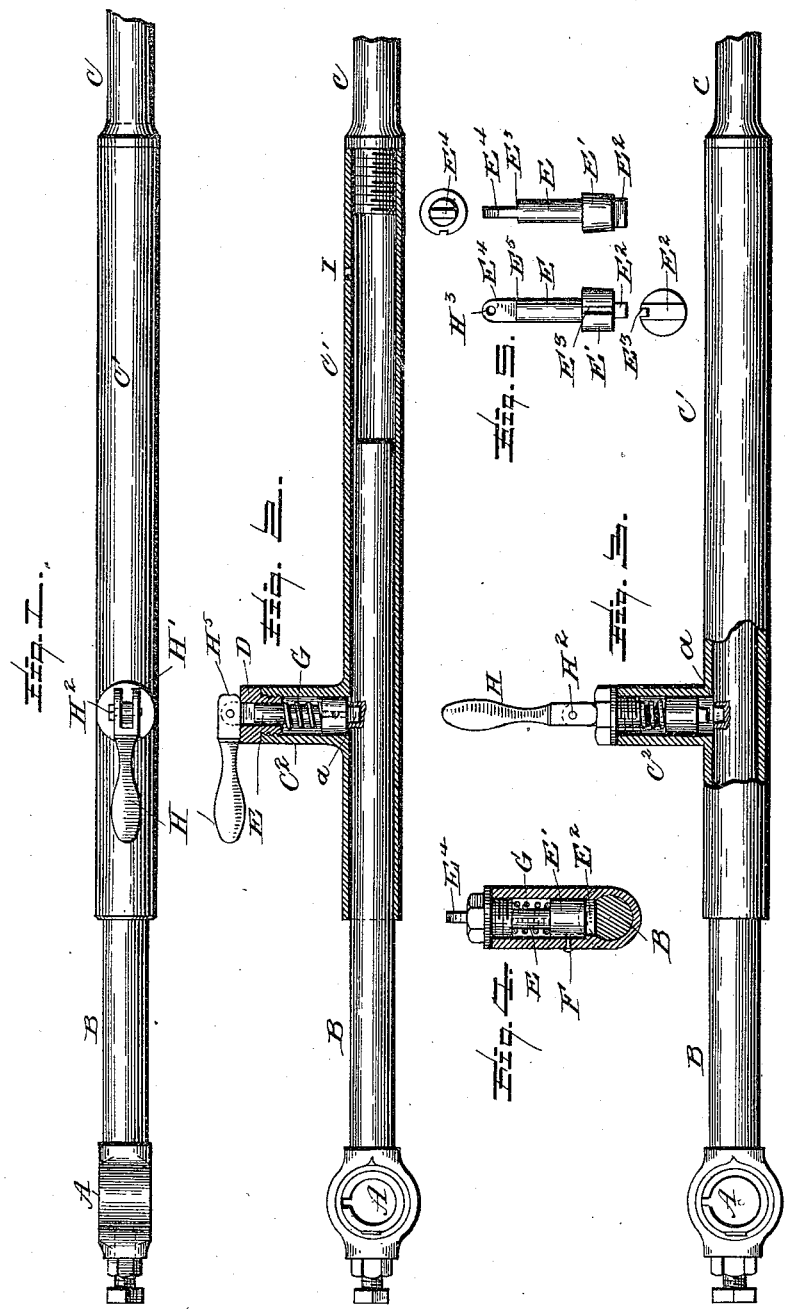

UNITED STATES PATENT OFFICE.

WILLIAM WRIGHT, OF NEWBURG, NEW YORK.

ECCENTRIC-ROD.

SPECIFICATION forming part of Letters Patent No. 428,542, dated May 20, 1890.

Application filed August 13, 1889. Serial No. 320,624. (No model.)

*To all whom it may concern:*

Be it known that I, WILLIAM WRIGHT, a citizen of the United States, residing at Newburg, in the county of Orange, State of New York, have invented certain new and useful Improvements in Eccentric-Rods, of which the following is a specification, reference being had therein to the accompanying drawings.

This invention relates to certain new and useful improvements in eccentric-rods for engines; and it has for its object to provide for the ready disengagement of the eccentric-rod without disconnecting the rod from the pin on the wrist-plate or rocker-arm whenever it is desirable to work the engine by hand. It has also for its object to provide a simple and efficient means for accomplishing this object. I provide a telescopic rod with a simple lock for rigidly holding the parts thereof.

The invention consists in the peculiarities of construction, and the novel combinations, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a top plan of the parts constituting my invention. Fig. 2 is a side elevation, partly in section, showing the parts of the rod engaged or connected together. Fig. 3 is a side view, part in section, of the same parts disengaged or disconnected. Fig. 4 is a vertical section through the lock. Fig. 5 are details of the locking-bolt removed.

Like letters refer to like parts throughout the several views.

Referring to the drawings by letter, A represents a head designed to be connected to the pin on the wrist-plate or rocker-arm.

B is a short piece of rod connected to said head in any suitable manner and of sufficient diameter to fit within the sleeve portion C' of the rod C, which leads to and is designed to be connected with the eccentric. This sleeve portion may be an integral part of the eccentric-rod, or it may be a separate part attached thereto by means of screw-thread engagement, as shown in Fig. 2.

The rod B is provided on that portion thereof which fits within the sleeve C' with a socket $a$, preferably formed of a piece of steel welded in the rod and hardened in any suitable manner. The sleeve C' near its end farthest from the rod C is formed with a boss $C^2$, in which the locking-bolt is incased and works.

D is a threaded plug engaging an integral thread at the upper end of the boss and having a central vertical aperture through which the locking-bolt E passes. This bolt is formed or provided near its lower end with the sleeve E', from which projects the lug $E^2$, of a corresponding shape to that of the socket $a$ in the rod B. This sleeve E' is formed with a vertical slot $E^3$, designed to receive the inner end of the guide-pin F, which passes through the wall of the boss $C^2$ and serves to guide the bolt in its vertical movement. The upper end of the bolt is reduced or flattened, as shown at $E^4$ in Fig. 5, forming square shoulders $E^5$. Around the bolt E, between the sleeve E' and the lower end of the plug D, is a coil-spring G, designed to normally keep the bolt projected, with its lug $E^2$ fitting the socket $a$ of the rod B, to rigidly hold or connect together the rod B and sleeve C', as shown in Fig. 2.

H is a hand-lever having cam portions H'. This lever is pivoted upon the bolt or pin $H^2$, which passes through the hole $H^3$ in the upper end of the bolt E. With the parts as shown in Fig. 2, with the lever horizontal, the spring G forces the bolt downward, its lug $E^2$ fitting the socket $a$ in the rod B and rigidly connecting the parts, as shown in said figure, in which position the parts are adapted to serve as one rod for the regular running of the engine. When it is desired to run the engine by hand, the lock-bolt is raised by turning the lever H to a vertical position, as shown in Fig. 3, allowing the rod C and sleeve C' to move forward and backward by the action of the eccentric, and the rod B is free to be moved in either direction by hand, the movements of each being independent of the others. A flat portion $H^5$ on the cam portion of the lever serves to retain the lever H in its vertical position.

I is a small vent-hole in the tube or sleeve C' for the escape of air.

The above-described construction constitutes what I at present consider the preferable form of carrying out my invention; but I do not intend to restrict myself thereto, as it is evident that various modifications in detail may be resorted to without departing from the spirit of the invention.

What I claim as new is—

1. The combination, with the eccentric-rod, the outer portion of which is formed with a boss, of a bolt arranged at right angles to the length of the rod and working within said boss, a spring around the bolt within the boss, a plug in said boss, and a cam-lever pivoted to the outer end of the bolt and bearing on said boss, whereby wear on the rod is prevented, substantially as described.

2. A telescopic eccentric-rod one part of which is provided with a boss, combined with a locking-bolt incased and movable in said boss and engaging a socket on the other part, and a cam-lever for actuating said bolt bearing on the boss, substantially as described.

3. The combination, with the rod B and sleeve C', embracing the same and formed with a boss, of the spring-actuated bolt in said boss and formed with a lug $E^2$ to engage a socket in the rod, and a cam-lever connected to and arranged to actuate the bolt and bearing on the head of the boss, substantially as described.

4. The combination, with the rod B and sleeve C', having a boss extending at right angles thereto, of the spring-actuated bolt working in said boss and having a vertical slotted sleeve, the lever for actuating the bolt and bearing on the head of the boss, and the guide-pin on the boss engaging the slot of the sleeve, substantially as described.

5. The combination, with the rod B and sleeve C', formed with boss $C^2$, of the apertured plug D in said boss, the spring-actuated bolt passed through said plug and formed with lug $E^2$ to engage a socket in the rod, and a cam-lever fulcrumed on the bolt and having flattened portions $H^5$ at its end bearing on the outer end of the plug, substantially as and for the purpose specified.

In testimony whereof I affix my signature in presence of two witnesses.

WILLIAM WRIGHT.

Witnesses:
CHARLES D. ROBINSON,
HENRY W. CHADEAYNE.